(12) United States Patent
Almukhtar et al.

(10) Patent No.: US 9,960,675 B2
(45) Date of Patent: May 1, 2018

(54) FEED-FORWARD CONTROL SYSTEM WITH CURRENT ESTIMATOR

(71) Applicant: SEMICONDUCTOR COMPONENTS INDUSTRIES, LLC, Phoenix, AZ (US)

(72) Inventors: Basil Almukhtar, Limerick (IE); Paul Harriman, Belfair, WA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 22 days.

(21) Appl. No.: 15/152,925

(22) Filed: May 12, 2016

(65) Prior Publication Data

US 2017/0133927 A1    May 11, 2017

Related U.S. Application Data

(60) Provisional application No. 62/251,465, filed on Nov. 5, 2015.

(51) Int. Cl.
*H02M 3/158* (2006.01)
*H02M 3/156* (2006.01)
*H02M 1/00* (2006.01)

(52) U.S. Cl.
CPC ............ *H02M 3/156* (2013.01); *H02M 3/158* (2013.01); *H02M 2001/0009* (2013.01); *H02M 2001/0019* (2013.01)

(58) Field of Classification Search
CPC ........ H02M 3/04; H02M 3/135; H02M 3/137; H02M 3/142; H02M 3/156; H02M 3/158;
(Continued)

(56) References Cited

U.S. PATENT DOCUMENTS 6,064,187 A     5/2000   Redl et al.
8,054,058 B2 *  11/2011  Liu ..................... H02M 3/1588
                                                          323/284
(Continued)

OTHER PUBLICATIONS

Defensive Publication IPCOM000010153D, "Methods for Accurate Droop Compensation During Load Transient conditions", Oct. 28, 2002, 8 pages.
(Continued)

*Primary Examiner* — Matthew Nguyen
(74) *Attorney, Agent, or Firm* — Polansky & Associates, P.L.L.C.; Paul J. Polansky (57) ABSTRACT

A method and apparatus for estimating capacitor current in a feed-forward control system includes a circuit that conducts a current through an output capacitor to ground and estimates a current magnitude for the current in an output current estimator. The current estimator generates a voltage that corresponds to the estimated current magnitude by creating a voltage drop across an estimator circuit capacitor that equals a voltage drop across the output capacitor, by creating a voltage drop across an output of an RC network of the estimator circuit that equals or is proportional to a voltage drop across the output capacitor due to parasitic inductance and parasitic resistance of the output capacitor. The voltage drop across the output of the RC network of the estimator circuit is proportional to current flowing through the parasitic inductance and resistance of the output capacitor.

23 Claims, 8 Drawing Sheets

(58) Field of Classification Search
CPC . H02M 2001/0009; H02M 2001/0019; H02M 2003/156; H02M 2003/158
See application file for complete search history.

(56) References Cited

U.S. PATENT DOCUMENTS

| | | | | |
|---|---|---|---|---|
| 8,319,486 | B2* | 11/2012 | Maksimovic | H02M 3/157 323/283 |
| 8,773,111 | B2* | 7/2014 | Nishikawa | H02M 1/4225 323/222 |
| 2014/0077787 | A1* | 3/2014 | Gorisse | H03F 1/0211 323/304 |
| 2015/0263614 | A1* | 9/2015 | Bansal | G01R 19/2506 323/282 |
| 2016/0315536 | A1* | 10/2016 | Harriman | G01R 19/0092 |

OTHER PUBLICATIONS

A.V. Peterchev et al., "Design of Ceramic—Capacitor VRM's with Estimated Load Current Feedforward", 2004 35th Annual IEEE Power Electronics Specialists Conference, Jun. 2004, pp. 4325-4332.

\* cited by examiner

FEED-FORWARD CONTROL SYSTEM WITH CURRENT ESTIMATOR

CROSS REFERENCE TO RELATED APPLICATIONS

This application claims priority to U.S. Provisional Application No. 62/251,465, filed on Nov. 5, 2015, entitled "FEED-FORWARD CONTROL SYSTEM WITH CURRENT ESTIMATOR," invented by Basil AlMukhtar and Paul Jay Harriman.

FIELD OF THE DISCLOSURE

The present disclosure relates generally to control circuits and systems and, more particularly, feed-forward control circuits and systems.

BACKGROUND

It is commonplace for digital integrated circuits to operate at higher frequencies that can create parasitic impedances for the various circuit elements. As the operating frequencies increase, the effects of parasitic impedances of the capacitors should often be considered when fine-tuning or designing a circuit or system. The effects of equivalent series resistance (ESR) and equivalent series inductance (ESL) in a typical digital application should be considered to properly predict circuit performance in design because the ESR and ESL of chip capacitors can dramatically alter the voltage drops across the integrated circuit (IC). The use of capacitors in digital circuitry is not new, but as microprocessor clock speeds increase, the parasitic effects of capacitors within integrated circuits (ICs) become more important.

As the ESR of a device increases, an increase in the ripple voltage for a given parasitic impedance of a capacitor. Additionally, increases in ESR can create unwanted voltage drops that affect circuit operation. Parasitic inductance also affects circuit operation by adding unwanted noise and undesired voltage drops. An increase in inductance results in an increase in the ripple voltage from switching and an increase in undesired voltage drops that should be accounted for in circuit design. Accounting for parasitic impedances (resistance and inductance) of a capacitor can be difficult especially when a fast response is needed in a feedback loop to support high frequency operations. While there are existing systems and/or circuit designs that provide fast feedback despite the parasitic impedances, such solutions are often complex and consume integrated circuit real estate and power.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
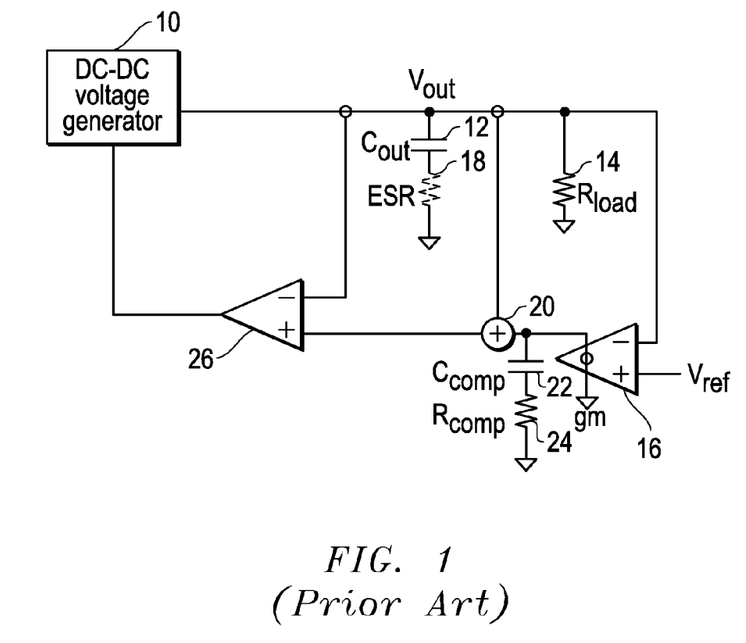
FIG. 1 is a partial schematic and partial block diagram of a prior art feed-forward control system.

FIG. 1 is a partial schematic and partial block diagram of a prior art feed-forward control system. Near-optimum dynamic regulation of a DC-DC converter is obtained by adding a feed-forward response of an output current to a current-mode controller. The results are near zero output impedance with reduced magnitude, duration, and energy content of the output-voltage transient after a transient change of output current. FIG. 1 illustrates the basic concept of load-current feed-forward circuit.

As may be seen, a DC-DC voltage generator 10 is connected to an output node Vout. Output node Vout is connected to an output capacitor 12, a load resistor Rload and an input of a first differential transconductance amplifier 16. A resistor 18 shown in dashed lines represents parasitic resistance (ESR) of capacitor 12 (Cout). First differential transconductance amplifier 16 is also connected to receive a reference voltage Vref. An output of first differential transconductance amplifier 16 is connected to a summing node 20 or circuit as well as to a capacitor 22 (Ccomp). Capacitor 22 is also connected to a resistor 24 (Rcomp) that is further connected to ground. The summing node 20 or circuit is also connected to load current and produces a sum of load current and the output of differential transconductance amplifier 16 to an input of a comparator 26 that is further connected at a second input to DC-DC voltage generator 10 output current.

DC-DC voltage generator 10 produces an output voltage at Vout to differential transconductance amplifier 16 that compares the output voltage to a reference voltage and produces an output error signal based on the difference of the two input signals. The result of the comparison is added to the load current that is then compared with DC-DC voltage generator 10 output current. By summing the voltage error signal and signal proportional to load current and feeding it to current mode comparator, the control loop will follow load current variation.

Figure 2:
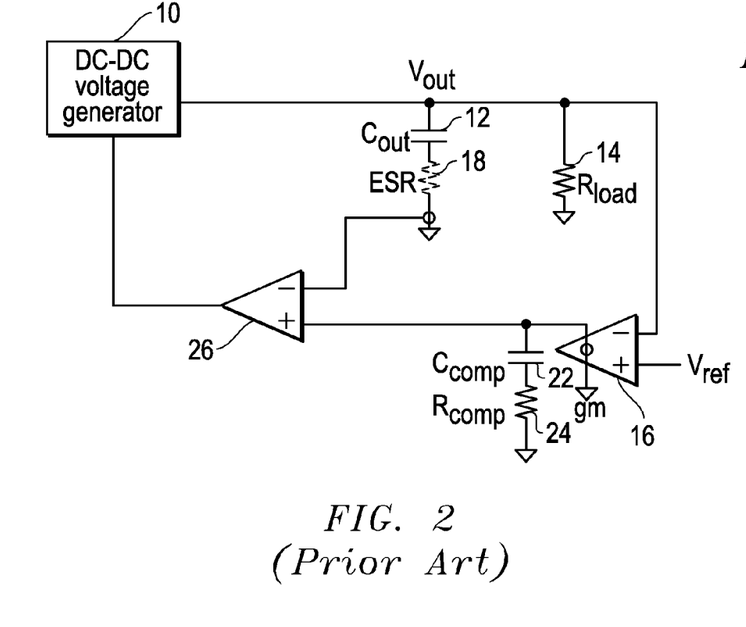
FIG. 2 is a partial schematic and partial block diagram of another feed-forward control system known in the prior art.

FIG. 2 illustrates a current mode control circuit with a capacitor feed-forward configuration wherein the feed-forward signal is the current of output capacitor rather that load current. The connections in FIG. 2 are substantially similar to FIG. 1 except that the second input of the second comparator 26 is connected to the output capacitor 12 current. One advantage of this circuit is that implementation is simpler. Adding a sense resistor or small current transformer in capacitor filter network is not practical, however, with complex output filter networks. Furthermore, the sense resistor adds complexity and impacts ripple performance. Accordingly, the embodiment of FIG. 2 may be advantageous for limited circumstances.

Figure 3:
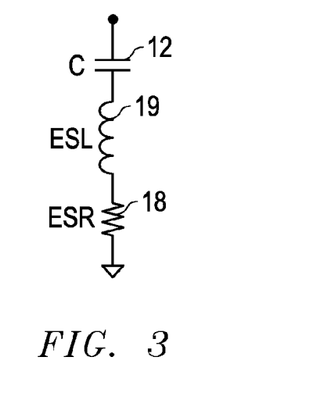
FIG. 3 is a schematic showing a capacitor model with parasitic inductance and resistance.

FIG. 3 is a schematic showing a capacitor model with parasitic inductance and resistance. The capacitor model includes a capacitor 12 that is in series with an inductor 19 and a resistor 18. The parasitic elements, namely, inductor 19 and a resistor 18 introduce parasitic inductance ESL and parasitic resistance ESR, respectively. For higher frequencies, parasitic impedance has inductive and resistive elements for a capacitor that should be accounted for in evaluating circuit performance.

Figure 4:
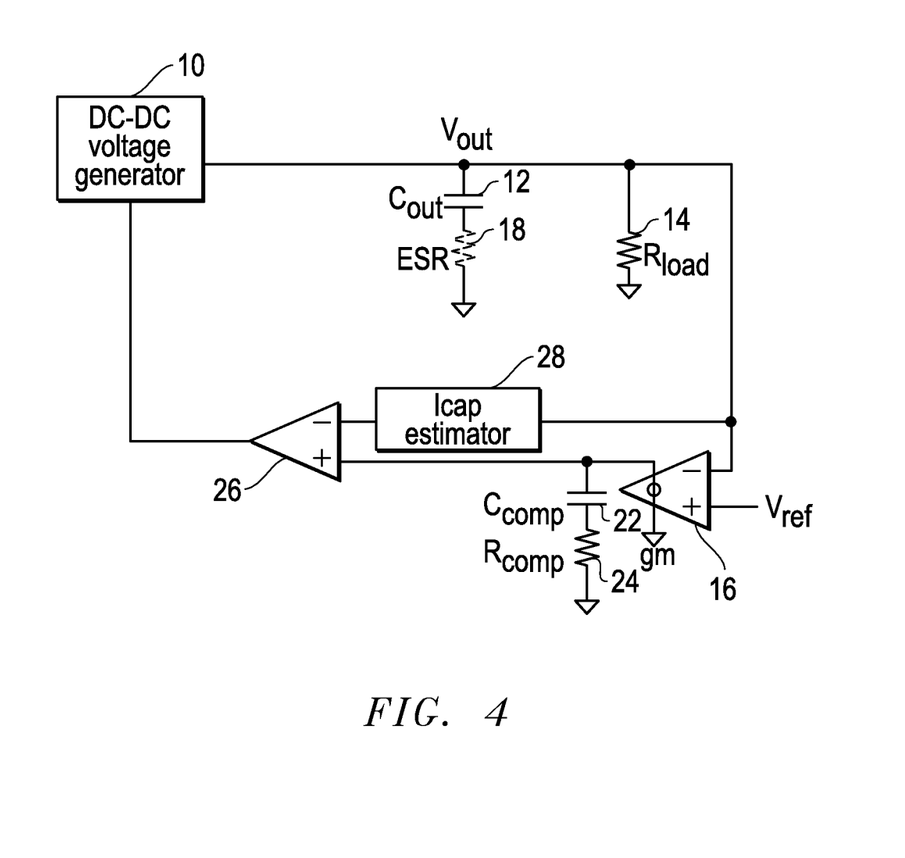
FIG. 4 is a partial schematic and partial block diagram illustrating an embodiment of a voltage regulator in a feed-forward control system.

FIG. 4 is a partial schematic and partial block diagram illustrating an embodiment of a voltage regulator in a feed-forward control system. One aspect of the prior approaches shown in FIGS. 1 and 2 is that a current is being measured. According to the various embodiments including the embodiment of FIG. 4, the capacitor current of the output capacitor is estimated. By estimating the capacitor current, circuit complexity and problems associated with direct capacitor current measurements are reduced. FIG. 4 illustrates such an approach by using a measured output voltage feedback signal, already available in current mode control, to estimate the output capacitor current. Essentially, a fast feed-forward control loop using lossless capacitor current sensing is used to estimate the output capacitor current to generate a feedback signal to the voltage regulator.

Referring to FIG. 4, DC-DC voltage generator 10 produces an output signal to output node Vout. Output node Vout is connected to output capacitor 12 (Cout) and load resistor 14 (Rload) as well as to a first input of first linear amplifier 16 and to Icap estimator 28. A second input of first differential transconductance amplifier 16 is connected to receive a reference voltage Vref. First linear amplifier 16 produces an output signal based on a difference in two input signals. An output of the differential amplifier 16 is produced to a first input of a comparator 26. A voltage signal representing an estimated output capacitor current through capacitor 12 is produced to a second input of second linear amplifier 26 by Icap estimator 28. Comparator 26 produces an output to DC-DC voltage generator 10 to adjust the output voltage produced by DC-DC voltage generator 10.

Output terminal Vout is further connected to an output capacitor 12 and to a load resistor 14. A resistor 18 is shown in dashed lines to represent parasitic resistance of capacitor 12. A current proportional to the difference between the two voltages produced to first linear amplifier 16 is produced to a first terminal of a second linear amplifier 26 as well as to a capacitor 22. Capacitor 22 is further connected to a resistor 24 that is also connected to ground.

Icap Estimator 28 is connected between a second terminal of comparator 26 and the output terminal Vout. Icap estimator 28 is configured to generate a voltage that corresponds to an estimated current flowing through output capacitor 12. The voltage produced by Icap Estimator 22 is compared with a voltage that appears across capacitor 22 and resistor 24 due to a current output produced by first differential amplifier 16. The output voltage of the comparator 26 comprises a feedback signal (error signal) that is produced to generator 10 to adjust the voltage produced by generator 10.

In operation, a current that flows from Vout through output capacitor 12 is a function of frequency and parasitic impedance of output capacitor 12 as well as an AC magnitude of Vout. Accordingly, for a given frequency, the current through output capacitor 12 will vary with the output voltage Vout. Accordingly, Icap estimator 28, which is connected to receive Vout, is able to estimate the current through output capacitor 12 based on a magnitude of Vout and to produce a voltage signal that corresponds to the estimated value of the current through output capacitor 12. This corresponding signal is then compared to a voltage across capacitor 22 and resistor 24 generated by differential transconductance amplifier 16. The output of comparator 26 then is produced to DC-DC voltage generator 10 to adjust the output voltage produced by DC-DC voltage generator 10.

Figure 5:
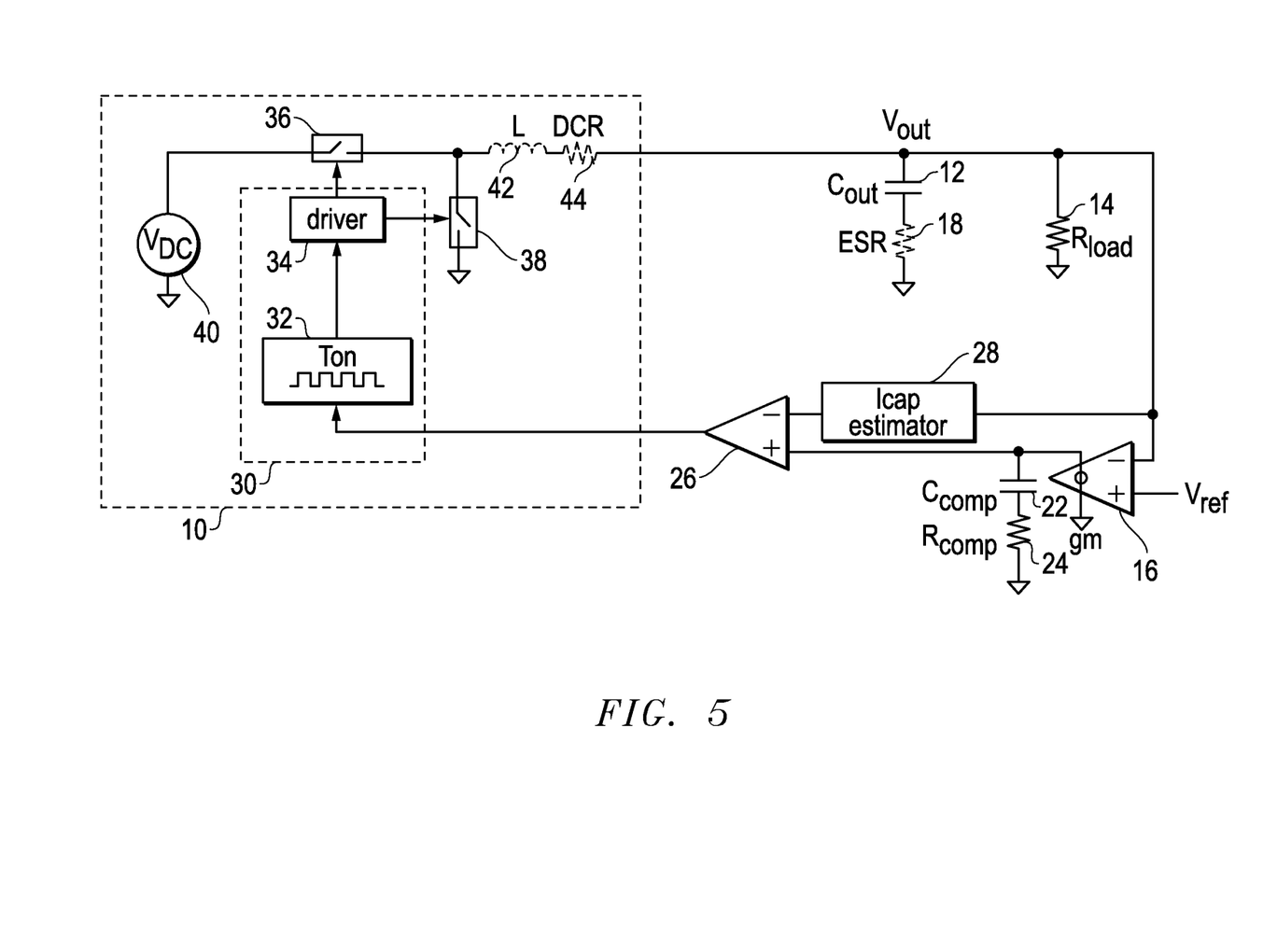
FIG. 5 is a partial schematic and a partial block diagram illustrating additional details of an embodiment of a voltage generator and regulator that includes a current estimator in a feed-forward control system.

FIG. 5 is a partial schematic and a partial block diagram illustrating additional details of an embodiment of a voltage generator and regulator that includes a current estimator in a feed-forward control system. As disclosed in relation to FIG. 4, the system of FIG. 5 includes the DC-DC voltage generator 10, linear amplifier 16 and comparator 26, Icap current estimator 28, output capacitor 12 and load resistor 14. Comparator 26 produces a first error signal to DC-DC voltage generator 10 based on a difference of a voltage signal produced by Icap estimator 28 and a voltage signal that is based on a second error signal produced by linear amplifier 16 in the form of a current signal. The second error signal is based upon a difference between Vout and a reference voltage.

As may further be seen, DC-DC voltage generator 10 comprises a pulse generator block 30 that further includes a pulse generator 32 and a driver 34 that is connected to receive the output of pulse generator 32. Pulse generator module 30, and more specifically, driver 34 is connected to deliver switch control signals to switches 36 and 38. Switch 36 connects a DC voltage source 40 to Vout. An inductor 42 and a resistance 44 represent parasitic inductance and resistance of the generator 10 and are thus shown in dashed lines. Switch 38 is also connected to ground. Pulse generator 32 generates pulses at a frequency based upon the first error signal magnitude to drive switches 36 and 38. Driver 34 sends control signals to open and close switches 36 and 38 based on the logical value of the pulses received from pulse generator 32.

Essentially, the DC voltage produced by DC voltage source 40 is delivered to inductor 42 and resistor 44 based on the logical state of the pulses produced by pulse generator 32. The characteristics of the pulses of pulse generator 32 (e.g., frequency, period, etc.) affect the timing of the operation of switches 36 and 38 and therefore affect the magnitude of the output voltage produced at Vout.

FIG. 5 thus illustrates a fast acting feed-forward control system with a high-bandwidth response that includes a pulse generator module that produces switch control signals based on a first error signal, first and second switches connected selectively charge and discharge inductor 42 wherein the first switch is also connected to a DC voltage source and the second switch is also connected to create a connection to ground. The first and second switches are configured to open and close based on the switch control signals and an output node connected to an output capacitor and a load resistor.

A current estimator connected to the output node in a feedback path generates an estimator output signal that corresponds to an estimated current flowing through the output capacitor. A first differential transconductance amplifier that produces a second error signal based on a difference between a reference voltage and output voltage at the output node. A comparator that compares the estimated output signal to a second error signal to produce the first error signal.

Figure 6:
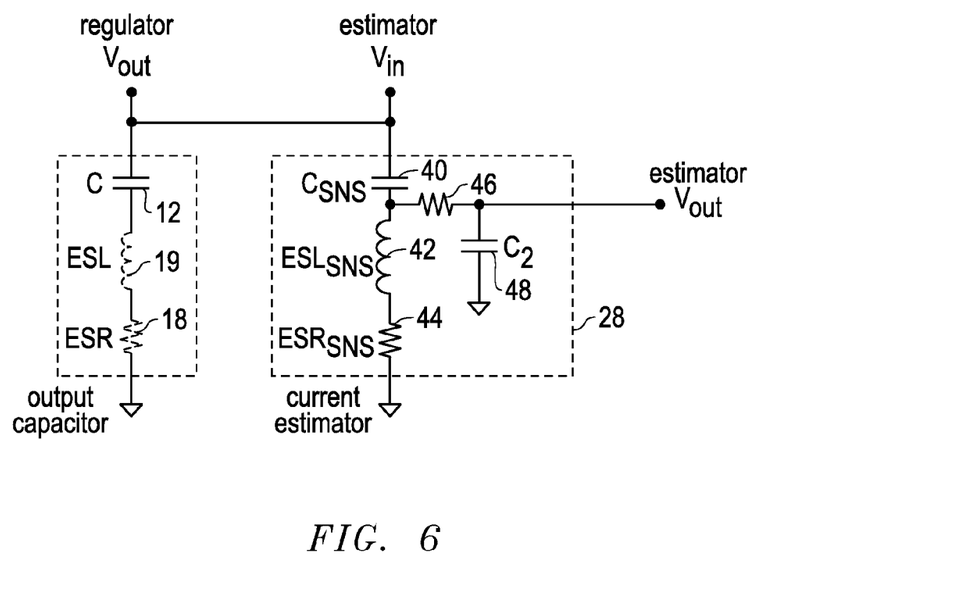
FIG. 6 is a functional schematic diagram of a current estimator that estimates a current through an output capacitor.
Figure 7:
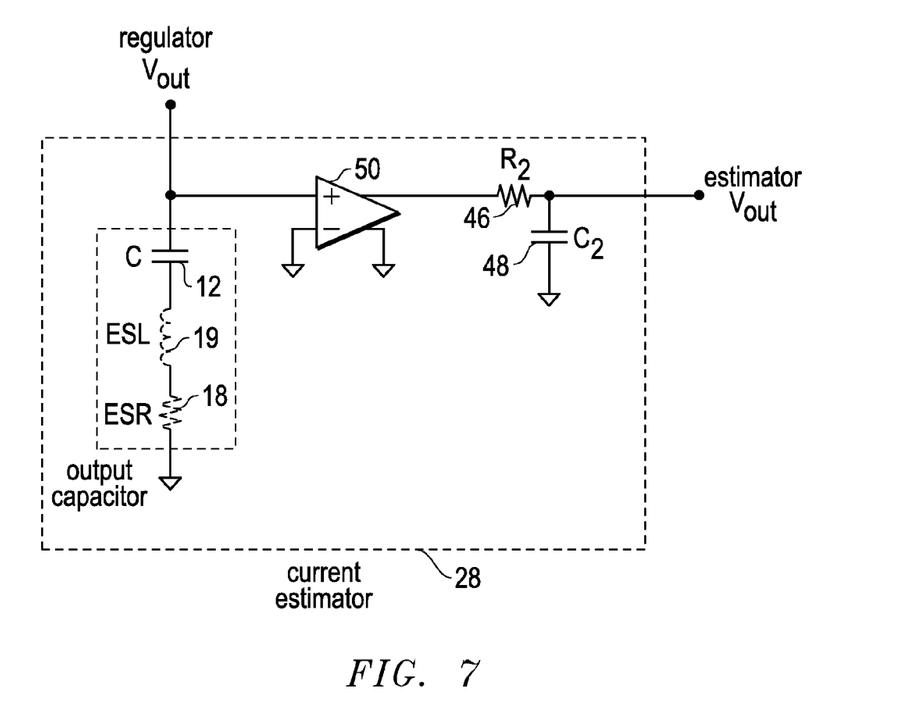
FIG. 7 is a partial schematic and partial block diagram that illustrates a current estimator according to one embodiment.

FIG. 6 is a functional schematic diagram of a current estimator that estimates a current through an output capacitor. Referring to FIG. 6, an output capacitor is modeled by a capacitor 12 (C), an inductive element 19 that represents parasitic inductance ESL of the output capacitor and a resistive element 18 that represents parasitic resistance ESR of the output capacitor. A current estimator includes a capacitive element 40 ($C_{sns}$) having a parasitic inductive element 42 and a parasitic resistive element 44 that generate inductance ($ESL_{sns}$) and resistance ($ESR_{sns}$) as well as a resistor 46 (R2) and a capacitor 48 (C2). Adding an RC circuit with the same time constant as ESL/ESR can generates a voltage proportional to ESR voltage (which is proportional to capacitor current—exactly as done with inductor current sensing). FIG. 7 illustrates a sense network having a buffered amplifier 50 to eliminate loading concerns and provide gain. As with FIG. 6, FIG. 7 includes resistor 46 (R2) and a capacitor 48 (C2) to generate the same time constant as ESL/ESR of the output capacitor 12 (C).

Figure 8:
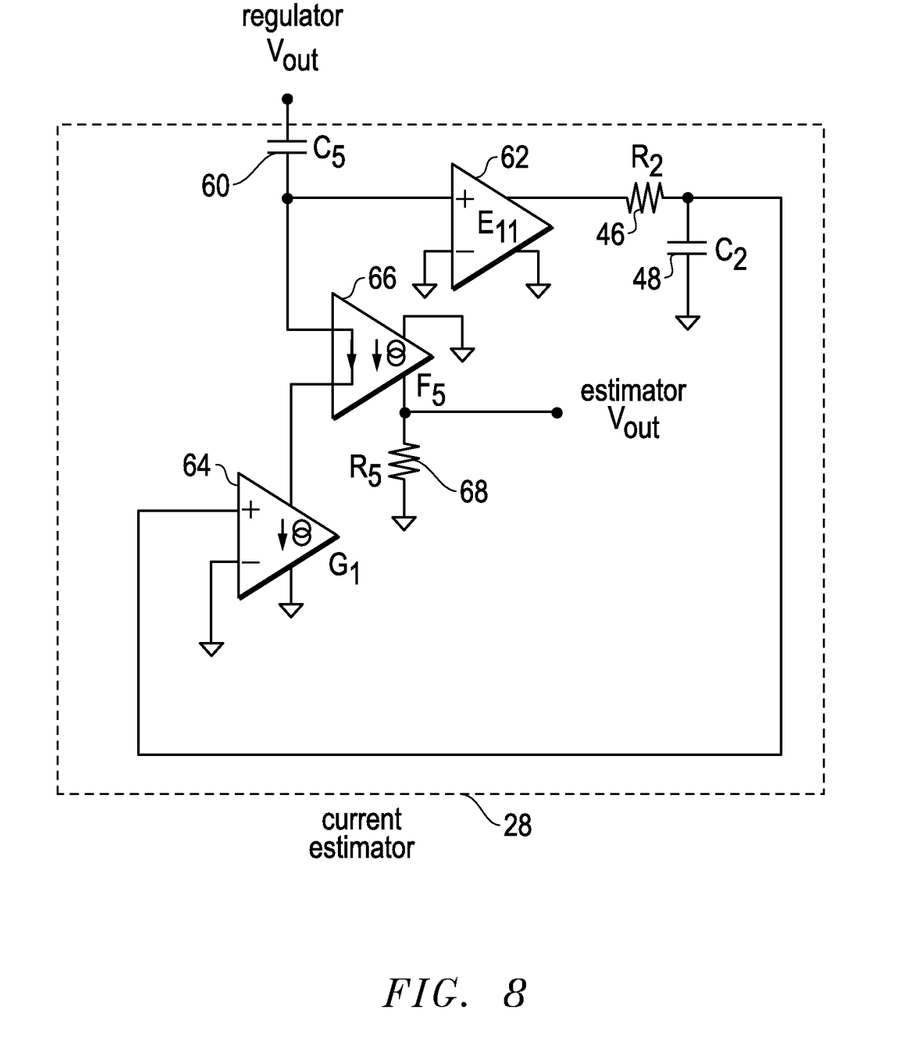
FIG. 8 is a partial schematic and partial block diagram that illustrates a current estimator according to one embodiment.

FIG. 8 is a partial schematic and partial block diagram that illustrates a current estimator according to one embodiment. An input node of a current estimator, labeled regulator Vout, is connected to receive the output of a regulator. The input node is connected to a capacitor 60 (C5) then to a first input node of a differential amplifier 62 (E11) and to a first input of current controlled current source 66 (F5). A second input of amplifier 62 is connected to ground. A first output of amplifier 62 is connected to a resistor 46 (R2) that is, at its other end, connected to a capacitor 48 (C2) that is also connected at its other end to ground. A second output of amplifier 62 is connected to ground.

The node that connects resistor 46 and capacitor 46 is further connected to a first input terminal of a voltage controlled current source 64 (G1). A second input terminal of voltage controlled current source 64 is connected to ground. A first "output" node of voltage controlled current source 64 is connected to a second "input" of current controlled current source 66. A first input of current controlled current source 66 is connected to capacitor 60 then to the input node of current estimator 22 labeled "regulator Vout". A first output of current controlled current source 66 is connected to ground while a second output of current controlled current source 66 is connected to resistor 68 (R5) and output node "estimator Vout". The other end of resistor 68 is connected to ground.

The current estimator of FIG. 8 includes amplifier 62, capacitor 60 (C5), resistor 46 (R2) and capacitor (C2) as did the circuit of FIG. 5. Here, however, amplifiers 66 (F5) and 64 (G1) are included to emulate current of the output capacitor. Amplifier 66 is a current controlled current source and amplifier 64 is a voltage controlled current source.

In operation, the output of amplifier 62 is produced to the RC circuit comprising resistor 46 and capacitor 48. The output of the RC circuit is produced as an input to voltage controlled current source amplifier 64. Amplifier 64 conducts current, therefore, based on the received voltage across capacitor 48 of the RC circuit. The current conducted by amplifier 64 charges capacitor 60 and drives current controller current source amplifier 66 that, in turn, drives an output current into a resistor 68. The resulting voltage across capacitor 60 corresponds to delta voltage across capacitive component of the output capacitor network while the voltage across resistor 68 is the output voltage signal that corresponds to the output current estimate through the output capacitor. This output voltage signal is produced as the estimator output voltage signal. In the described embodiment, the circuit may be tuned by tuning or adjusting gain elements of the amplifiers 62, 64 and 66, as well as the resistive and capacitive values of capacitors 48 and 60 and resistors 46 and 68.

Figure 9:
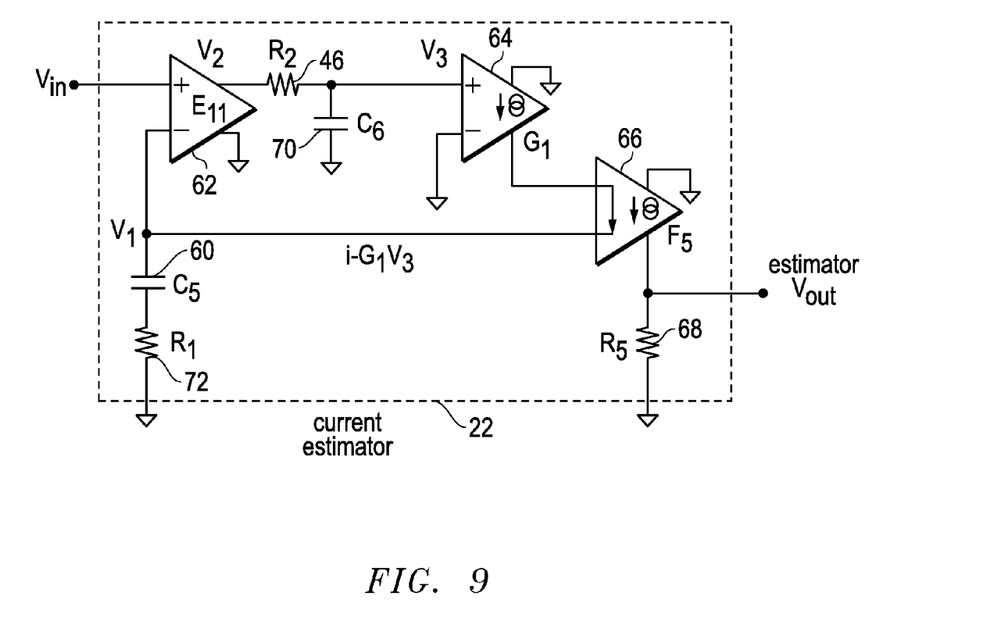
FIG. 9 is a partial schematic and partial block diagram that illustrates a current estimator according to one embodiment.

FIG. 9 is a partial schematic and partial block diagram that illustrates a current estimator according to one embodiment. An input node of a current estimator, labeled regulator Vin, is connected to receive the output of a regulator. The input node is connected to a first input node of a differential amplifier 62. A second input of amplifier 62 is connected to node V1. A first output of amplifier 62 is connected to a resistor 46 that is, at its other end, is connected to a capacitor 70 (C6) that is also connected at its other end to ground. A second output of amplifier 62 is connected to ground. A voltage V3 appearing at the node that connects resistor 46 and capacitor 70 is the input voltage of voltage controlled current source amplifier 64. A second input terminal of voltage controlled current source amplifier 64 is connected to ground. A first "output" node of amplifier 64 is connected to a first "input" of current controlled current source amplifier 66 F5. A second output of amplifier 64 is connected to ground. A second input of amplifier 66 is connected to node V1 and to the second input of amplifier 62. A first output of amplifier 66 is connected to ground while a second output of amplifier 66 is connected to resistor 68 (R5). The other end of resistor 68 is connected to ground.

The current estimator of FIG. 9 includes amplifier 62 and resistor 46 and capacitor 70 (similar to FIG. 7) as well resistors 68 and 72 and capacitors 60 and 70, all of which are configured to be adjustable in one embodiment. Amplifiers 64 and 66 are included to emulate current information of the output capacitor.

In operation, the output of amplifier 62 is produced to the RC circuit comprising 46 and capacitor 70. The output of the RC circuit is produced as an input to voltage controlled current source amplifier 64. Amplifier 64 conducts current, therefore, based on the received voltage across capacitor 70 of the RC circuit. The current conducted by amplifier 64 drives current controller current source amplifier 66 that, in turn, drives an output current into a resistor 68. The resulting voltage across resistor 68 then is the output voltage signal that corresponds to the output current estimate through the output capacitor. This output voltage signal is produced as the estimator output voltage signal. In the described embodiment, the circuit may be tuned by tuning or adjusting, via one or more of amplifiers 62-66, and/or the resistive and capacitive values of resistors 46, 68 and 72 and capacitive values 60 and 66.

Figure 10:
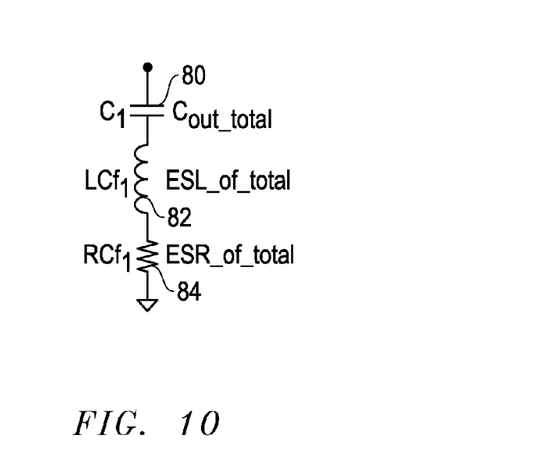
FIG. 10 is a function schematic diagram that illustrates a capacitor equivalent circuit of the current estimator.

FIG. 10 is a functional schematic diagram that illustrates a capacitor equivalent circuit of the current estimator. As may be seen, a capacitor 80 (C1) is connected in series with inductor 82 (Lcf1) and resistor 84 (Rcf1). The equations that correspond to the equivalent circuit of FIG. 10 for $Z_{out}$ are as follows:

$$Z_{out} = ESR + S_{ESL} + 1/(SC_{out}) \quad (1)$$

$$Z_{out} = \frac{(1 + S^2 C_{out} * ESL + SC_{out} * ESR)}{(SC_{out})} \quad (2)$$

As may be seen from formula (1), the output impedance of the output capacitor varies according to the parasitic impedances ESL and ESR. Formula (2) illustrates an alternative expression for Zout. Cout_total in FIG. 8 is the total output capacitance. ESL_cf_total is the equivalent series inductance and ESR_cf_total is the equivalent series resistance. Referring back to FIG. 7, therefore, the inverse of $Z_{out}$ may be expressed as follows:

$$1/Z_{out} = V_{out}/V_{in} = SC_{out}/(1 + S^2 C_{out} * ESL + SC_{out} * ESR) \quad (3)$$

G1 is equal to 1/ESR_cf_total, R2=1/ESR_cf_total, C6=ESL_cf_total, C5=Cout_total, RL=1 and R1=0 for the above expression. Since capacitor current is bidirectional, both positive and negative voltages are required in a practical estimator. Accordingly, the amplifier outputs are biased at a level above ground. The estimator circuit with the described embodiment does not affect closed-loop poles or zeroes of the system when there is perfect matching of the estimator and power train capacitor filter parameters.

Referring again to FIG. 9, if the effects of resistor 72 (R1) are ignored, and if it is assumed that the voltage across capacitor 60 (C5) is equal to Cf1, the difference between capacitor 60 (C5) and Vin is equal to the voltage across LCf1 and RCf1. The voltage at V2 is equal to the voltage across LCf1 and RCf1 and the output of the RC network (resistor 46 and capacitor 70) is proportional to current flowing through LCf1 and RCf1 and, therefore, to current flowing through Cf1 if resistor 46 and capacitor 70 have the same time constant as LCf1/RCf1.

Scaling of C5 to the output capacitor of the circuit (e.g., Cout=capacitor 12) can be done in conjunction with scaling of amplifier 64. This is independent of scaling of resistor 46 and capacitor 70. The current estimator topology feeds a current proportional to the capacitor 60 voltage into capacitor 60 until the capacitor 60 voltage equals the Cf1 voltage. Though the estimator does have a feedback loop, it does not require high gain. Low fixed gain buffers in a Thevenin loop decouple the impedance of capacitor 60 from the resistor 46 and capacitor 70 impedance. One advantage, therefore, is that the sense C and value of the RC impedance may be set independently due to the decoupling provided by the combination of buffers and feedback. The amplifiers do not need high gain or bandwidth.

Figure 11:
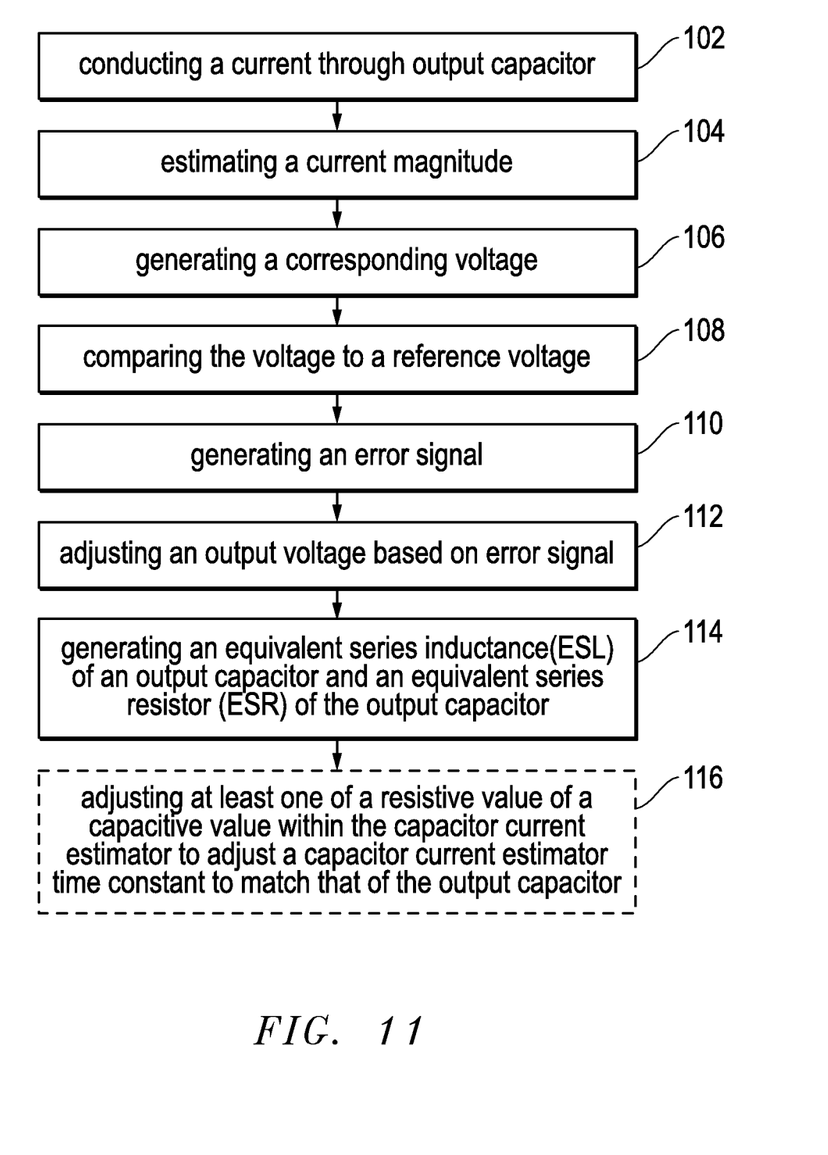
FIG. 11 is a flowchart illustrating a method according to one embodiment for generating an equivalent series inductance (ESL) of an output capacitor and an equivalent series resistance (ESR) of an output capacitor.

FIG. 11 is a flow chart illustrating a method according to one embodiment for generating an equivalent series inductance (ESL) of an output capacitor and an equivalent series resistance (ESR) of an output capacitor. The method commences with a circuit, e.g., a voltage regulator among others types of circuits, conducting a current through output capacitor (102). In the described embodiment, a feedback loop is utilized in which a current estimator estimates a current through an output capacitor to generate a feedback signal to the regulator circuit. Accordingly, the next step includes estimating a current magnitude in the output capacitor (104) and generating a corresponding voltage (106).

In one embodiment, the corresponding voltage is compared to a reference voltage (108) and generating an error signal (110) based on the comparison between the reference voltage and the corresponding voltage. Accordingly, the method includes adjusting an output voltage based upon the error signal (112). One aspect of the embodiment of the invention is that the current estimator generates an equivalent series resistance (ESR) of an output capacitor and an equivalent series inductance (ESL) of the output capacitor (114). Optionally, the method further includes adjusting at least one of a resistive value or a capacitive value within the capacitor current estimator to adjust a capacitor current estimator time constant to match that of the output capacitor (116).

Figure 12:
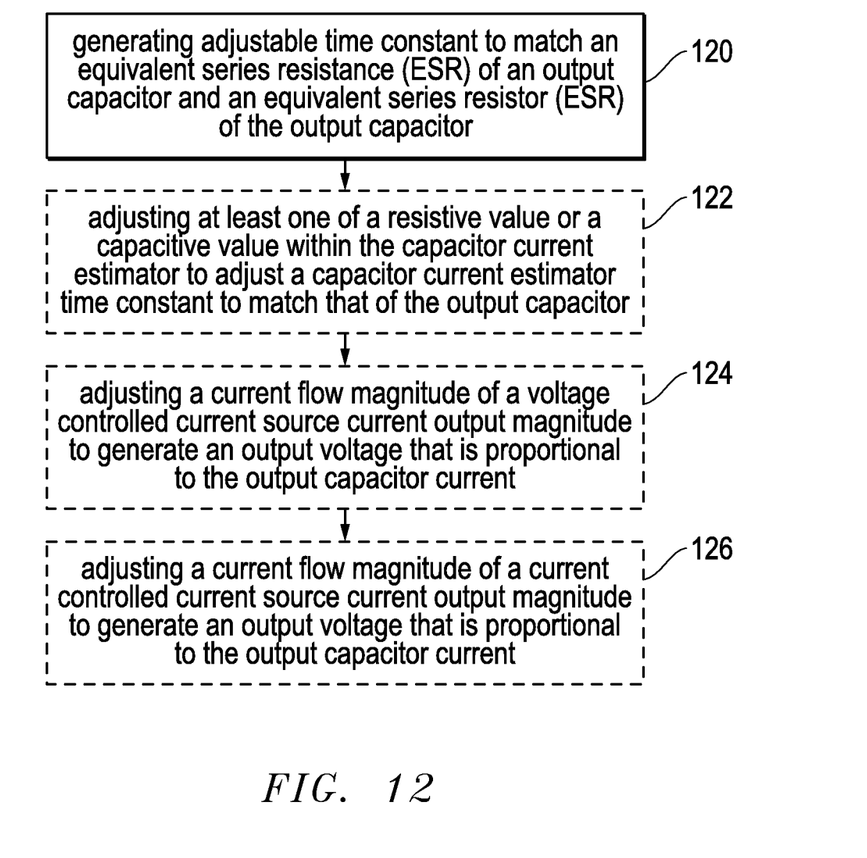
FIG. 12 is a flow chart illustrating a method according to one embodiment.

FIG. 12 is a flow chart illustrating a method according to one embodiment. The method commences with a circuit, and more particularly, a current estimator circuit generating an equivalent series resistance (ESR) of an output capacitor and an equivalent series resistor (ESR) of the output capacitor (120). The method further includes adjusting at least one of a resistive value or a capacitive value within the capacitor current estimator to adjust a capacitor current estimator time constant to match that of the output capacitor (122). Additionally, the method includes the current estimator circuit adjusting a current flow magnitude of a voltage controlled current source current output magnitude to generate an output voltage that is proportional to the output capacitor current (124). Finally, the method includes adjusting a current flow magnitude of a current controlled current source current output magnitude to generate an output voltage that is proportional to the output capacitor current (126).

The above-disclosed subject matter is to be considered illustrative, and not restrictive, and the appended claims are intended to cover all such modifications, enhancements, and other embodiments that fall within the true scope of the claims. Thus, to the maximum extent allowed by law, the scope of the present invention is to be determined by the broadest permissible interpretation of the following claims and their equivalents, and shall not be restricted or limited by the foregoing detailed description.

What is claimed is:

1. A feed-forward control system, comprising:
 a pulse generator module that produces switch control signals based on a first error signal;
 first and second switches connected selectively charge and discharge an inductor wherein the first switch is also connected to a DC voltage source and the second switch is also connected to create a connection to ground wherein the first and second switches are configured to open and close based on the switch control signals;
 an output node connected to an output capacitor and a load resistor;
 a current estimator connected to the output node in a feedback path, wherein the current estimator generates an estimator output signal that corresponds to an estimated current flowing through the output capacitor, wherein the current estimator creates a voltage drop that equals or is proportional to a voltage drop across the output capacitor due to parasitic inductance and parasitic resistance of the output capacitor;
 a differential transconductance amplifier that produces a second error signal based on a difference between a reference voltage and an output voltage at the output node; and
 a comparator connected to receive the second error signal and the estimator output signal and that is operable to compare the estimator output signal to the second error signal to produce the first error signal.

2. The feed-forward control system of claim 1, the current estimator further including a voltage controlled current source configured to adjust a voltage drop within the current estimator to match a voltage drop due to parasitic impedances of the output capacitor.

3. The feed-forward control system of claim 1, the current estimator further including a current controlled current source configured to adjust a voltage drop within the current estimator to match a voltage drop due to parasitic impedances of the output capacitor.

4. The feed-forward control system of claim 1, the current estimator further including a voltage controlled current source and a current controlled current source, each having adjustable time constant circuitry configured to adjust a voltage drop within the current estimator to match a voltage drop due to parasitic impedances of the output capacitor.

5. The feed-forward control system of claim 4, the current estimator further including a buffer coupled between the adjustable time constant circuitry wherein the buffer provides isolation and gain to the estimator output signal.

6. The feed-forward control system of claim 4 wherein the voltage controlled current source and the current controlled current source each include selectable gain elements to adjust an estimator output signal time constant of the estimator output signal.

7. The feed-forward control system of claim 1, the current estimator further comprising:
a current controlled current source having an output that produces the estimator output signal;
a voltage controlled current source that regulates a voltage-controlled current conducted through the current controlled current source;
a first selectable resistive element connected to an input of the voltage controlled current source;
a differential amplifier connected to receive the output voltage produced by the feed-forward control system and further connected to receive an estimator feedback voltage, wherein the differential amplifier produces a third error signal to the first selectable resistive element;
a selectable current estimator capacitor connected to a second input of the differential amplifier and to an input of the current controlled current source to receive voltage controlled current conducted through the current controlled current source; and
wherein the first selectable resistive element and selectable current estimator capacitor are configured to adjustably produce a voltage drop to match a voltage drop of a controller output capacitor's equivalent series resistance (ESR) and equivalent series inductance (ESL).

8. A feed-forward control system, comprising:
a circuit operating at a clock rate that produces an output voltage at an output node; and
a feedback loop that further comprises:
a differential transconductance amplifier that generates a first error signal at the clock rate based on a difference between a voltage that corresponds to a capacitor current estimate and a reference voltage;
a capacitor current estimator that produces a voltage that corresponds to the capacitor current estimate, wherein the capacitor current estimator creates a voltage drop that equals or is proportional to a voltage drop across an output capacitor due to parasitic inductance and parasitic resistance of the output capacitor; and
a comparator that compares the first error signal to the voltage that corresponds to the capacitor current estimate to produce a second error signal to the circuit to adjust the output voltage.

9. The feed-forward control system of claim 8, the capacitor current estimator further comprising:
a current controlled current source having an output that produces the estimator output signal;
a voltage controlled current source that regulates a voltage-controlled current conducted through the current controlled current source;
a first selectable resistive element connected to an input of the voltage controlled current source;
a differential amplifier connected to receive the output voltage produced by the feed-forward control system and further connected to receive an estimator feedback voltage, wherein the differential amplifier produces a third error signal to the first selectable resistive element; and
a selectable current estimator capacitor connected to a second input of the differential amplifier and to an input of the current controlled current source to receive voltage controlled current conducted through the current controlled current source.

10. The feed-forward control system of claim 9, wherein the voltage controlled current source is configured to adjust a voltage drop within the capacitor current estimator to match a voltage drop due to parasitic impedances of the output capacitor due to equivalent series resistance (ESR) of the output capacitor.

11. The feed-forward control system of claim 9, wherein the current controlled current source is configured to adjust a voltage drop within the capacitor current estimator to match a voltage drop due to parasitic impedances of the output capacitor due to equivalent series inductance (ESL) of the output capacitor.

12. The feed-forward control system of claim 8, the capacitor current estimator further including a voltage controlled current source and a current controlled current source, wherein the voltage controlled current source adjusts at least one voltage drop within the capacitor current estimator to match a voltage drop due to parasitic impedances of the output capacitor due to equivalent series resistance (ESR) time constant of the output capacitor and the current controlled current source adjusts a voltage drop within the capacitor current estimator to match a voltage drop due to parasitic impedances of the output capacitor due to equivalent series inductance (ESL) time constant of the output capacitor.

13. The feed-forward control system of claim 12, the capacitor current estimator further including a buffer coupled between an input and the voltage controlled current source wherein the buffer provides isolation and gain for the voltage that corresponds to the capacitor current estimate produced by the capacitor current estimator.

14. The feed-forward control system of claim 13 wherein the voltage controlled current source and the current controlled current source each include selectable components to adjust an estimator output signal time constant of the estimator output signal.

15. A method for estimating capacitor current in a feed-forward control system, comprising:
conducting a current through an output capacitor to ground;
estimating a current magnitude for the current in an output current estimator and generating a voltage that corresponds to the estimated current magnitude, wherein the estimating comprises creating a voltage drop that equals or is proportional to a voltage drop across an output capacitor due to parasitic inductance and parasitic resistance of the output capacitor;

comparing the voltage to a reference voltage;
generating an error signal based on said comparing; and
adjusting an output voltage based on the error signal.

16. The method of claim 15, the output current estimator further including generating adjustable time constant to match an equivalent series resistance (ESR) of the output capacitor.

17. The method of claim 15, further including the output current estimator generating adjustable time constant to match an equivalent series inductance (ESL) of the output capacitor.

18. The method of claim 15 further including adjusting at least one of a resistive value or a capacitive value within the output current estimator to adjust an output current estimator time constant to match that of the output capacitor.

19. The method of claim 15 further including adjusting a current flow magnitude of a voltage controlled current source current output magnitude to generate an output voltage that is proportional to the output capacitor current.

20. The method of claim 15 further including adjusting a current flow magnitude of a current controlled current source current output magnitude to generate an output voltage that is proportional to the output capacitor current.

21. A method for estimating capacitor current in a feed-forward control system, comprising:
    conducting a current through an output capacitor to ground;
    estimating a current magnitude for the current in an output current estimator and generating a voltage that corresponds to the estimated current magnitude by:
    creating a voltage drop across an estimator circuit capacitor that equals a voltage drop across the output capacitor;
    creating a voltage drop across an output of an RC network of the estimator circuit that equals or is proportional to a voltage drop across the output capacitor due to parasitic inductance and parasitic resistance of the output capacitor; and
    wherein:
        the voltage drop across the output of the RC network of the estimator circuit is proportional to current flowing through the parasitic inductance and resistance of the output capacitor; and
        the RC network of the estimator circuit has a time constant that is the same as the time constant of the output capacitor due to the parasitic inductance and capacitance.

22. The method of claim 21 further including scaling the estimator circuit capacitor in relation to the output capacitor.

23. The method of claim 21 further including
    conducting an output current through an output resistive element to create an output voltage;
    comparing the output voltage to a reference voltage;
    generating an error signal based on said comparing; and
    adjusting the output voltage based on the error signal.

* * * * *